United States Patent [19]

Zito, Jr. et al.

[11] 4,053,684
[45] Oct. 11, 1977

[54] METHOD OF OPERATING A FUEL CELL

[75] Inventors: Ralph Zito, Jr., Westford; Lawrence J. Kunz, Jr., Fitchburg, both of Mass.

[73] Assignee: GEL, Inc., Durham, N.C.

[21] Appl. No.: 741,134

[22] Filed: Nov. 11, 1976

Related U.S. Application Data

[63] Continuation of Ser. No. 296,243, Oct. 10, 1972, abandoned.

[51] Int. Cl.$^2$ ............................................. H01M 8/04
[52] U.S. Cl. ......................................... 429/15; 429/25
[58] Field of Search ......................... 429/12, 13, 15, 25

[56] References Cited

U.S. PATENT DOCUMENTS 3,150,998  9/1964  Reitemier ................................ 429/13
3,234,116  2/1966  Holt et al. ............................... 429/12

FOREIGN PATENT DOCUMENTS 1,212,387  11/1970  United Kingdom ................... 429/13

Primary Examiner—John H. Mack
Assistant Examiner—H. A. Feeley
Attorney, Agent, or Firm—Jerry Cohen; Charles Hieken

[57] ABSTRACT

Fuel cell comprising anolyte and catholyte compartments separated by a diffusion barrier and using sodium sulfide aqueous solution as anolyte and an aqueous catholyte solution. The apparatus is controlled to maintain a positive pressure differential across the anolyte/catholyte interface in the barrier towards the anolyte side to attenuate sulfide ion migration to the catholyte and reduce solid sulfur precipitation in the catholyte and thereby attenuate consequent cathode passivation or other forms of catholyte compartment poisoning.

3 Claims, 5 Drawing Figures

METHOD OF OPERATING A FUEL CELL

CROSS REFERENCE TO RELATED APPLICATIONS

This is a streamline continuation of copending application Ser. No. 296,243 filed Oct. 10, 1974, now abandoned.

This application concerns an improvement on the subject matter described in our copending U.S. patent application Ser. No. 256,924 filed May 25, 1972 now U.S. Pat. 3,920,474. Reference is also made to the copending application of Zito, Serial No. 300,244 filed of even date herewith now abandoned and entitled "Improved Fuel Cell" and to the copending application of Zito, Ser. No. 27,488 filed July 25, 1972, now abandoned and to the copending U.S. patent application of Williams, Ser. No. 276,149 filed July 28, 1972, now U.S. Pat. No. 3,881,956. All of said applications are of common assignment herewith and incorporated herein by reference as though set out at length herein.

BACKGROUND OF THE INVENTION

Fuel cells of the liquid/liquid type—i.e. having anolyte and catholyte with the anolyte containing a fuel and the catholyte containing an anti-fuel—can utilize sulfide ion containing fuels to produce high power levels and energy storage levels in a fuel cell construction which is simple and economical to build and operate. The maintenance of energy conversion performance of the fuel cell is subject to deterioration if molecular sulfur is allowed to form and collect on the anode or cathode. The problem on the anolyte side is inherently minimized if a sufficient concentration of sodium sulfide is utilized in the anolyte because the sulfide solution dissolves molecular sulfur readily.

It is an important object of the present invention to provide further improvement in fuel cells of the type described.

It is a further object of the invention to provide a mechanism for limiting the possibility of free sulfur formation in the catholyte of fuel cells of the type described, using sulfide ion in the anolyte.

It is a further object of the invention to provide low cost, simple means for removing operating life limitations of fuel cells containing sodium sulfide or other liquid-liquid fuel cells, consistent with one or both of the preceding objects.

SUMMARY OF THE INVENTION

In accordance with the present invention, fuel cell apparatus is constructed and operated in a way to establish and maintain a catholyte/anolyte interface in the separating membrane which is biased towards the anolyte side.

In preferred and distinctly advantageous embodiments, this is accomplished by establishing a pressure differential between the anolyte and catholyte systems with the catholyte system having a higher pressure than the anolyte system thereby providing a pressure gradient towards the anolyte side. The pressure gradient is established across the barrier in an amount effective to displace the two-electrolyte interface (hereafter referred to as the interface) to a position where some means may be employed to remove harmful reaction products or where diffusion of one component through the barrier is prevented by a counter flow of the opposite electrolyte.

Where the anolyte comprises aqueous sulfide and the catholyte is a nonmetallic oxidizing agent, the free sulfur formed at the interface by direct combination is redissolved in the anolyte if the interface is displaced to the anolyte surface of the barrier where there is a constant excess of sulfide ion. If the interface were within the barrier, solid sulfur would clog the pores. If the interface were at the cathode face of the barrier, colloidal sulfur would form in the catholyte with deleterious effects on performance and cathode life. Where the separator is a 1 mil thick electrochemical grade microporous (0.5 $\mu$) polypropylene film, the pressures involved are on the order of $\frac{1}{2}$ psi between the anolyte and catholyte in a system pressurized to about 3 psig. Clearly, the pressures and membranes involved are not utilizing osmotic phenomena and the benefits of the invention are believed to be due solely to the displacement of the two electrolyte interface, biased as above, and/or to the establishment of a sufficient flow of one electrolyte through the barrier to overcome diffusion of harmful components of the other.

The principles of the invention may be expanded for application to other electrochemical systems where a diffusing ion from a first cell compartment has a tendency to precipitate in or otherwise poison the opposite electrode or opposite electrolyte if it reaches the other compartment of a two-compartment electrolytic cell and is therefore biased, in accordance with principles derived herefrom, to remain and react in its original compartment where chemical corrective means are available. For example, the decomposition rate of recirculating hydrogen peroxide electrolyte would be greatly accelerated by the diffusion of ferric ions from a second electrolyte. An appropriate pressure differential would attenuate this diffusion and limit the attendant decomposition losses. In a two electrolyte system where the presence of one ion might destroy the plating quality of another, (Cu/Zn), or where immersion plating consumes a metallic electrode, (Cu/Zn, Fe/Zn) a pressure differential can be used to control undesirable diffusion and enhance electrode utilization.

The interface biasing can serve multiple purposes. It can be combined with other improvements such as the multichamber arrangement set forth in the first application of Zito, cited above—e.g. with such multi-chamber arrangement preventing catholyte to anolyte diffusion and the present invention limiting the converse diffusion.

An alternative to pressure differential interface biasing is pre-saturation of the separator and/or sequential filling of anolyte and catholyte compartments to effect said interface displacement.

Numerous other objects, features and advantages of the invention will become apparent from and/or are described in detail, along with the foregoing, in the following detailed description of preferred embodiments, taken in connection with the accompanying drawings, in which

DETAILED DESCRIPTION OF PREFERRED EMBODIMENTS

Figure 1:
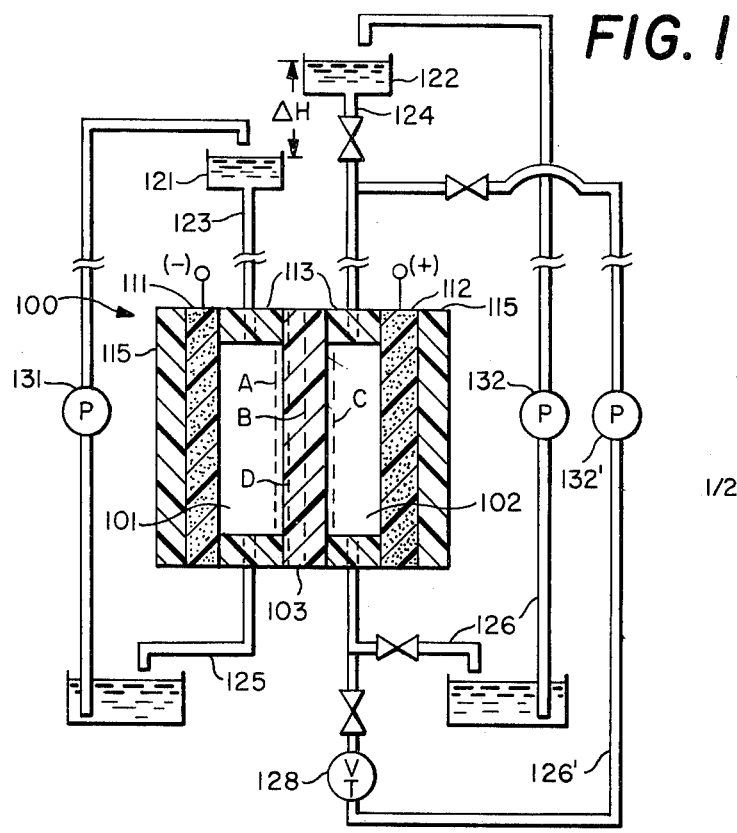
FIG. 1 is a diagrammatic sketch of fuel cell apparatus of the type described utilizing a combination of means for building up a pressure differential which can be used singly or in combination.

Referring to FIG. 1, there is shown a preferred embodiment of the fuel cell 100 comprising anolyte and catholyte compartments 101 and 102, respectively, formed by separation of the cell into two compartments by an intermediate microporous diffusion barrier 103— an electrochemical grade separator with pores on the order of 0.1 μ diameter and a thickness of 1–10 mils. The cell has an anode 111 and cathode 112 in the anolyte and catholyte compartments, respectively. The cell is formed by stacking the electrodes and barrier with separating spacer elements 113 having integral feed channels, and cover plates 115. A reservoir of anolyte 121 supplies anolyte compartment 101 via a feed line 123 and the anolyte compartment is drained by a drain line 125 and the drained anolyte can be pumped through a pump 131 for return to the reservoir 121. The catholyte is fed from a catholyte reservoir 122 to catholyte compartment 102 via a feed line 124 and drained via a drain line 126 for recirculation to the reservoir via pump 132. A throttle valve 128 can be provided in an alternative catholyte drain line 126 for purposes hereafter described.

The particulars of construction of the cell 100 in single cell form or in multi-cell form can be as described in the said application Ser. No. 256,924 or in the above cited copending application of Williams. It will be understood that while only a single cell is shown here, the invention can be practiced on some or all of the unit cells of a multi-cell array.

In accordance with this preferred and distinctly advantageous embodiment of the present invention, the cell constructions of the above referenced disclosures are modified by means for inducing a pressure gradient to bias the anolyte/catholyte interface. On such means is the establishment of a pressure differential by providing differing vertical heights for the lines 123 and 124. This height differential ΔH can be as little as a few inches difference or several feet. Another such means which can be used where the interface biasing is done by establishing higher pressure in catholyte than anolyte is to provide a throttle valve 128 in the alternative catholyte drain line 126, which, together with feed line 124 and a positive displacement pump 132, forms a closed loop recirculating system with fixed volumetric flow throughout. Still further methods of creating such pressure differential would include appropriate sizing of drain lines 125, 126 and/or feed lines 123, 124 or of the compartments 101, 102. If centrifugal pumps are used at 131, 132, they can be regulated to create such a pressure differential.

Dashed lines A, B, C and D indicate some possible locations of the two-electrolyte interface. The extremes of A and C wherein the interface is displaced into one or the other of the electrolyte compartments are undesirable —C because the objects of the invention are defeated thereby, and A because the large net flow through the barrier, in most cases, would increase losses by direct reaction at the expense of electrochemical reaction. Line B indicates the natural position of the interface in the center of the barrier. In the case of a metallic and/or sulfide ion containing anolyte and/or a hydrogen peroxide containing catholyte, both of which would benefit from the limiting of diffusion from the anolyte side of the barrier to catholyte side while allowing ion transfer from catholyte to anolyte, the ideal interface location is D, near the anode-confronting face of the barrier 103 where the interface is washed by the flowing anolyte. Bias conditions can be adjusted to approximate this ideal by setting conditions, operating the cell and then examining the barrier 103 after operation to see if coating or clogging occurred at its anode confronting face (indicating that conditions B or even C may be occurring) by examining the catholyte and the cathode for telltale symptoms of undesirable diffusion namely rapid peroxide decomposition (metallic ion diffusion) or sulfurization of the cathode and catholyte (sulfide ion diffusion) indicating that condition C had occurred, and by monitoring anolyte reagent utilization which will decrease if the extreme condition of A is approached due to excessive bias.

Figure 2:
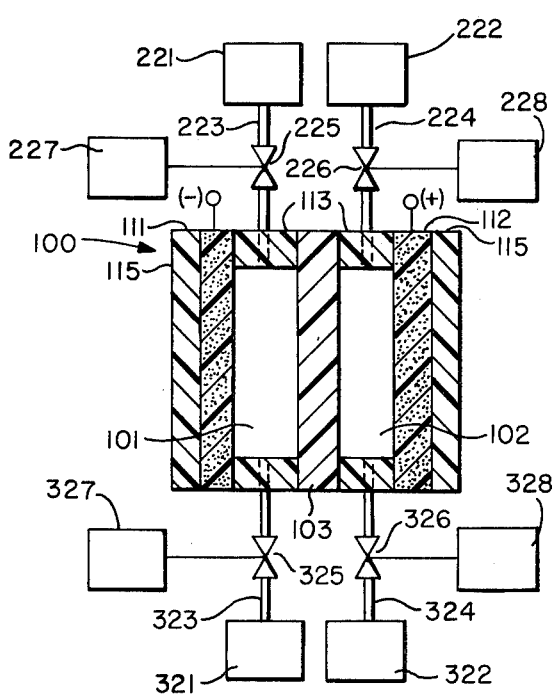
FIG. 2 is a similar diagrammatic sketch of a fuel cell system which is operable in timed fill-drain sequence of anolyte and catholyte.

FIG. 2 shows another embodiment of the invention incorporating an alternative interface biasing approach. A cell 100 is constructed as in FIG. 1 with similar parts being similarly numbered. An anolyte feed line 223 supplies anolyte from a reservoir 221 to the anolyte compartment 101 via a valve 225 having an operator 227 and anolyte is drained to a storage vessel 321 via drain line 323 having a valve 325 with an operator 327. Catholyte is supplied from vessel 222 to catholyte compartment 102 via a feed line 224 having a valve 226 with an operator 228 and drained to a vessel 322 via line 324 having a valve 326 with an operator 328. The valves may be simple hand valves or even check valves and no pump is shown here since the feed may be as simple as gravity feed, the cell being of the once-through type. A first cycle might involve feeding from 221 and 222 into the compartments 101 and 102, respectively, and then draining into compartments 321 and 322 respectively. Then for a subsequent cycle, the entire apparatus could be turned over so that vessels 321 and 322 are on top providing gravity feed to the cell 100 with drain to vessels 221 and 222. Pumps can be added, if desired, to supplement or in lieu of reliance on gravity feed. In the FIG. 2 embodiment, the desired positive bias of anolyte/catholyte interface towards anolyte compartment 101 can be established by timing sequence of fill of anolyte and catholyte in each such cycle so that the catholyte is filled first and then the anolyte is subsequently filled or so that catholyte fill is at least phased ahead of anolyte fill. This has the effect of saturating the diffusion barrier 103 with catholyte and biasing the interface. Drain sequence would be the opposite of fill sequence. The time delay involved would be about one minute per 5 mil thickness of barrier depending on wetting properties of the barrier. The preceding embodiment can also be practiced through other means of saturating the membrane 103 such as by providing a lateral flow of soaking catholyte solution therefore —i.e. from its edges inwardly.

Figure 3:
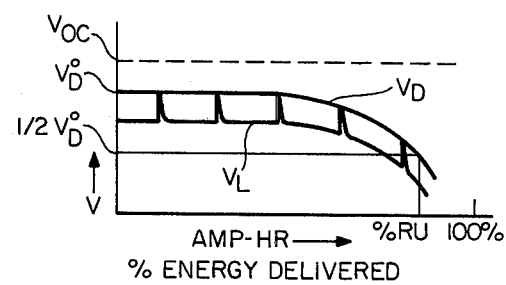
FIG. 3 is a generalized performance curve showing how curves of the type given in FIGS. 4–5 are generated.

FIG. 3 shows the form of performance curve used for measuring the effectiveness of particular fuel cells. The curve shows voltage versus energy delivered in terms of ampere hours or ampere minutes. A dashed line indicates the open circuit potential of the cell with fresh fuel and no load. The curve $V_L$ represents the actual cell voltage under load including internal IR drops as well as polarization losses. $V_D$ is generated by periodically interrupting the load on the cell and observing the recovered voltage or driving potential. For most of our systems, the electrodes do not recover from their polarized state in the response time of the recorder and so only IR losses are eliminated. Cell reistance as measured alternatively corroborates this fact. Comparison of $V_D$ rather than $V_L$ eliminates the distracting influence of varying individual cell resistance. The fuel is considered spent when the driving potential, $V_D$, drops to half of $V_D$', its initial value. The percentage of total energy of the fuel which is delivered to this point is called reagent utilization (RU).

Figure 4:
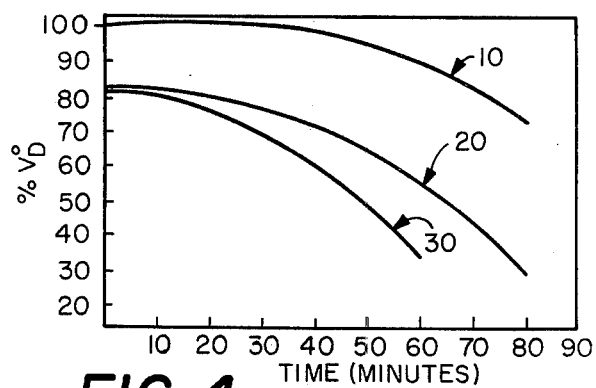
FIGS. 4–5 are graphs of performance data.
Figure 5:
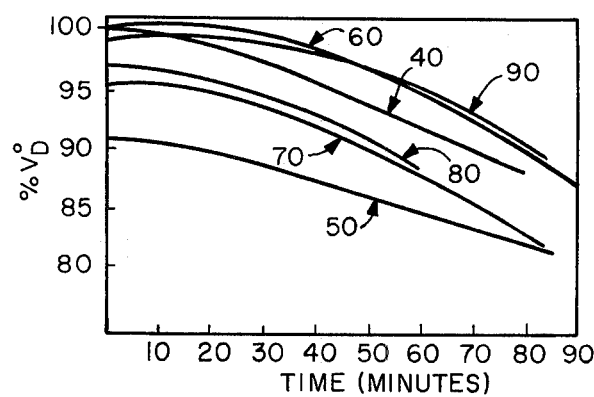

FIGS. 4 and 5 show the percent of the initial driving potential developed - (this normalizes for varying cell resistance and current density) versus energy delivered (as time at constant current).

It is an established criterion of the art that this curve should be essentially flat and close to $V_{OC}$ until near 100% reagent utilization at which point it would drop sharply. In practice, with recirculating systems such as ours, polarization increases as fuel is depleted and the reagent utilization is somewhat less than 100%.

FIGS. 4 and 5 represent experimental data plotted in accordance with the foregoing key, FIG. A depicting performance of an aqueous sodium sulfide/acidic hydrogen peroxide fuel cell not utilizing a pressure differential to attenuate sulfurization of the cathode components, and FIG. 5 showing performance of a similar cell using an interface bias means as explained above in connection with FIG. 1. In particular, reservoirs were used with the height of the anolyte reservoir 123 being 101.5 inches and the height of the catholyte reservoir 124 being 112.5 inches giving a pressure differential of about 0.4 psi in a system pressurized to about 4 psig.

The fuel cells were single cells of 60 in² electrode area with 0.030 inch electrolyte compartments and a 0.010 inch microporous polyethylene separator (W. R. Grace's *Daramic*).

The cell of FIG. 4 was operated at 1 amp/in² and had an internal resistance of 5 mΩ. Curves 10, 20, and 30 represent successive cycles with fresh electrolytes. The degradation is readily apparent. Solid sulfur was observed in the catholyte and on the cathode surface.

The cell of FIG. 5 had an internal resistance of 9 mΩ and was operated at ⅓ A/in² with a pressure differential of 0.4 psi as described above. Curves 40-50, 60-70, 80 and 90 represent four cycles of the cell, the first two cycles were twice as long as the others and had partial fuel replenishment while in operation between curves 40-50 and 60-70. Significant is the fact that the cell operates as well at curve 90 as it did initially at 40, representing about ten hours intervening operation.

It is evident that those skilled in the art may make numerous modifications and uses of and departures from the specific embodiments described above without departing from the inventive concepts hereof. Accordingly, it is intended that the invention shall be construed as embracing each and every novel feature and novel combination of features present in or possessed by the apparatus or prcess herein described and that the foregoing disclosure shall be read as illustrative and not as limiting except to the extent set forth in the claims appended hereto.

What is claimed is:

1. Method of operating a fuel cell comprising,
   means forming a first compartment and an anode therein,
   means forming a second compartment and a cathode therein, the second compartment being adjacent the first compartment,
   means forming a microporous ion diffusion membrane separating said compartments,
   a liquid electrolyte in said first compartment and a liquid electrolyte in said second compartment, and an interface between said electrolytes located within said membrane,
   one of said electrolytes comprising a fuel dissolved therein and the other of said electrolytes comprising an antifuel dissolved therein, through
   the step of establishing a pressure differential between said electrolytes so that there is a pressure gradient between the liquids in a direction to combat undesired transport, which would naturally occur in the absence of specific establishment of such combating pressure differential, of an ionic species contained in one of the electrolytes which tends to poison the other electrolyte or electrode of the other electrolyte compartment, if transported thereto, or to poison the membrane if transported therein.

2. Method of operating a fuel cell in accordance with claim 1 wherein the pressure differential is controlled to displace the two electrolyte interface within the membrane towards the electrolyte which contains the potentially poisoning ionic species.

3. Method in accordance with claim 1 wherein the anolyte comprises aqueous sodium sulfide solution and the pressure is maintained higher in the catholyte than in anolyte to counteract sulfide ion transport.

* * * * *